UNITED STATES PATENT OFFICE.

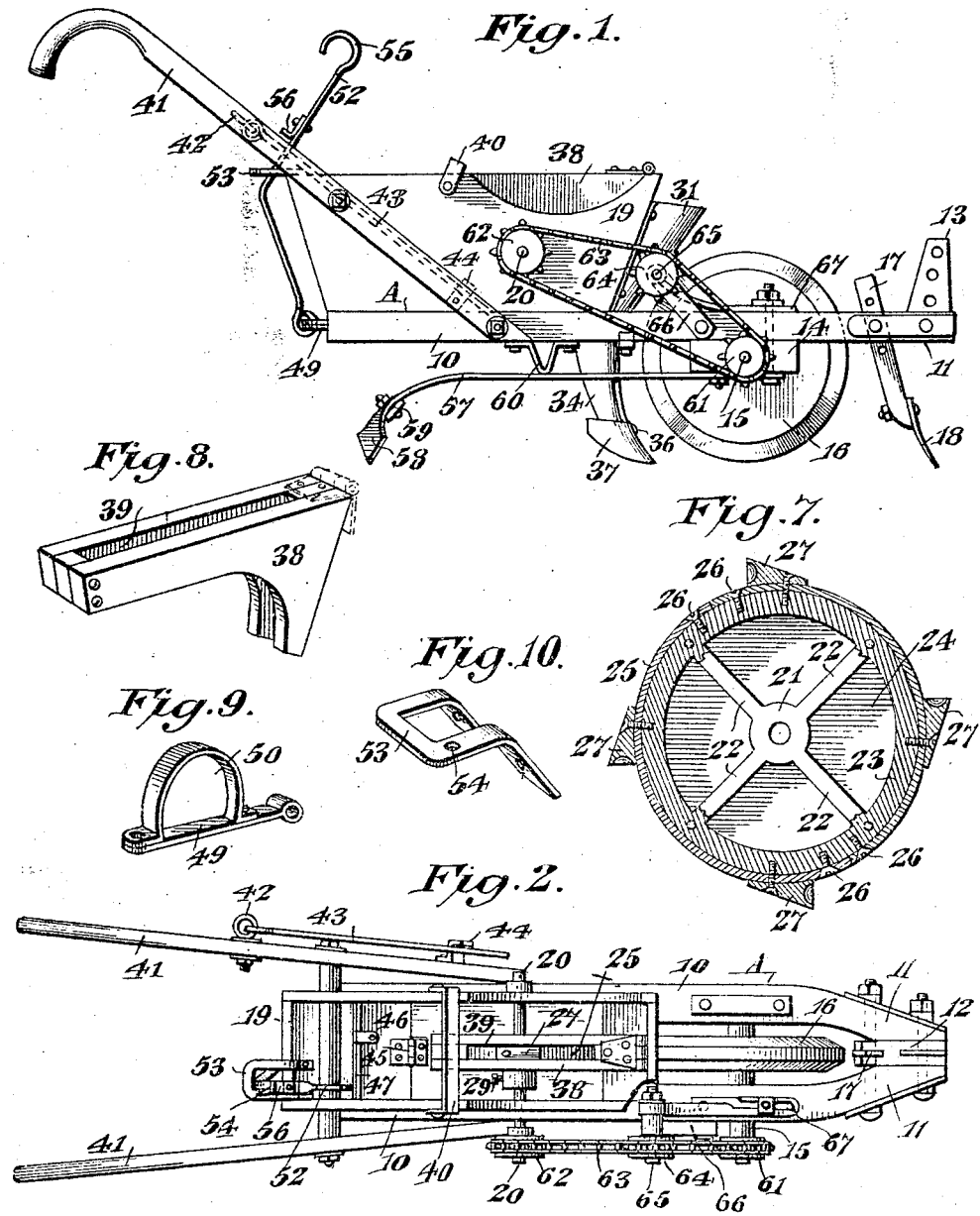

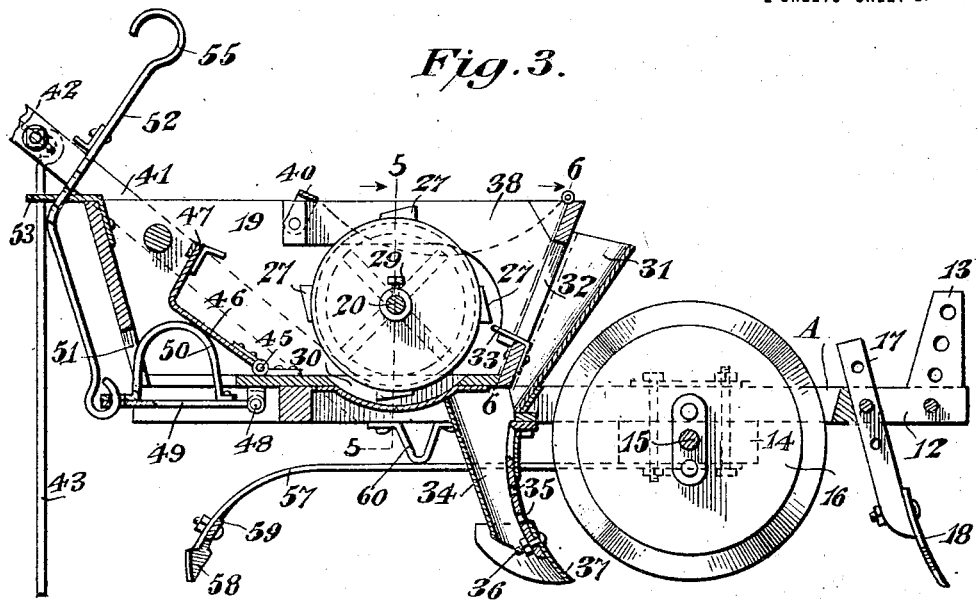

GEORGIA D. BURNETT, OF HATCHER STATION, GEORGIA.

PLANTING-MACHINE.

1,285,610.   Specification of Letters Patent.   Patented Nov. 26, 1918.

Application filed November 15, 1917. Serial No. 202,209.

*To all whom it may concern:*

Be it known that I, GEORGIA D. BURNETT, a citizen of the United States, residing at Hatcher Station, in the county of Quitman and State of Georgia, have invented a new and useful Planting-Machine, of which the following is a specification.

The invention relates to a planting machine, and more particularly to the class of machines for planting peanuts, peas, beans, corn, sorghum, cotton, and other seeds.

The primary object of the invention is the provision of a machine of this character wherein the planter wheel is of sectional construction, thereby saving material and minimizing cost in the making of the same, and also permitting the interchanging of the seed cups when occasion requires.

Another object of the invention is the provision of a machine of this character wherein the same will be supported in standing position while at rest to facilitate the filling of the seed box, and when in use will be prevented from overturning, which is advantageous in planting level or ridged land.

A further object of the invention is the provision of a machine of this character wherein the seed box is of such a construction as to reduce pressure on the seed when planting.

A further object of the invention is the provision of a machine of this character wherein the seed box will assure the proper feeding of the seeds to the planter wheel, that is to say, the seed can be lightly fed, or the quantity thereof increased to vary the planting operation, the advantage of which is that when planting a field that has both a sandy soil and bottom land, the sandy soil can be sowed light while the other soil can be sowed thick.

A still further object of the invention is the provision of a machine of this character which is comparatively simple in construction, thoroughly reliable and effective in its operation, certain parts of which are readily and easily adjusted to vary the operation of the planter, and also one which is inexpensive in manufacture.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the accompanying drawings,

Figure 1 is a side elevation of a planter constructed in accordance with the invention.

Fig. 2 is a top plan view thereof.

Fig. 3 is a vertical longitudinal sectional view through the machine showing the prop in position for preventing the overturning of the planter.

Fig. 4 is a rear elevation with parts in section looking toward the forward end of the machine.

Fig. 5 is an enlarged transverse sectional view on the line 5—5 of Fig. 3, looking in the direction of the arrow.

Fig. 6 is a sectional view on the line 6—6 of Fig. 3, looking in the direction of the arrow.

Fig. 7 is a vertical sectional view through for the planter wheel.

Fig. 8 is a perspective view of the guard for the planter wheel.

Fig. 9 is a perspective view of the lifting member for the tilting section within the seed box.

Fig. 10 is a perspective view of the keeper for the lifting lever shown in Fig. 9.

Similar reference characters indicate corresponding parts throughout the several views in the drawings.

Referring to the drawings in detail, A designates generally the main frame which is of substantially rectangular shape including the spaced parallel side beams 10 having the forwardly converging ends 11, which are united to a casting 12 therebetween. From this casting rises a clevis post 13 for the detachable connection of draft animals. Fixed to and depending from the side beams 10 are block bearings 14 in which is journaled a transverse shaft 15 supporting a furrow wheel 16 which is located between the beams 10 of the frame, while adjustably mounted in the casting 12 is the stem 17 of a furrow opener or clearer 18 which is disposed forwardly of the furrow wheel 16 preferably in the position shown in Figs. 1 and 3 of the drawings.

Secured upon the frame 10 rearwardly of the furrow wheel 16 and co-extensive in length with substantially one half of said frame is a seed box 19, in the side walls of which is journaled a transverse shaft 20 for supporting interiorly of said box 19, a planter wheel hereinafter fully described.

The planter wheel comprises a hub 21 having radially extending spokes 22 integral therewith, and an annular rim 23 integral with said spokes, while integral with the hub, spokes and rim at one side is a disk-like cheek plate 24. Cheek plate 24 has its periphery extended beyond the rim to form a counter-seat for receiving the sections 25 of a band which encircles the rim 23 and is detachably fastened thereto through the medium of fasteners 26, and fixed to these sections 25 at intervals are seed cups 27 which are detachable therefrom so that said seed cups can be interchanged as occasion may require. Secured to the opposite side of the planter wheel is a removable disk-like cheek plate 28 which has its periphery extending beyond the rim 23, and in this manner the counter-seat is closed at this side of the wheel, see Fig. 5. In other words, the removable cheek plate 28 is of a size corresponding to the size of the cheek plate 24 and when mounted upon the rim the projected peripheries of said plates form a counter-seat concentrically of the rim for the sections 25 of the band. In constructing the wheel in this manner a saving of material in the making thereof is had, thereby minimizing the cost of manufacture as well as permitting the interchanging of the seed cups.

Tapped in the hub 21 of the planter wheel is a set screw 29 which secures the planter wheel upon the shaft 20, while the bottom of the seed box 19 is formed with a channel or well 30 in which works the periphery of the planter wheel and the seed cups for the filling of the cups with seed within the seed box in the operation of the machine.

Secured to the front end of the seed box 19 is a seed spout 31, the front end of the box being formed with an elongated opening 32 establishing communication between the box and said spout; and secured to said front end at the lower extremity of the slot 32 and projecting into the seed box is a spout 33 which directs the seed from the cups 27 into the delivery spout 31. The latter at its lower end opens into the drill spout 34 fixed to and depending from the bottom of the seed box 19 rearwardly of the furrow wheel 16 for the discharge of the seed into the furrow on the advancement of the machine through a field.

The drill spout 34 at its front has formed therein holes 35 for receiving a fastener 36 which adjustably secures thereto a plow point 37 for opening the furrow prior to the discharge of the seed therein from said spout 34 on the advancement of the machine.

Hinged to the top edge of the front wall of the seed box is a swinging guard 38, which has an open center 39 to accommodate the planter wheel, and the purpose of this guard when in the position shown in Figs. 2, 3 and 5 is to prevent the escape of seed from the cups 27 of the planter wheel. The guard consists of spaced plates having at their front end depending portions which act to direct the seed to the seed spout 31, as shown in Fig. 3. On raising the guard easy access to the planter will be had to permit the changing of the planter wheel should it be required. Pivoted to the sides of the seed box 19 is an inverted substantially U-shaped latch bail 40 which holds the guard 38 in the position shown in Figs. 2, 3 and 5 of the drawings, and on the swinging of the bail 40 rearwardly, the guard can be raised on the hinge connection thereof for access to the planter wheel and seed box.

Secured to the opposite sides of the seed box 19 are the usual forwardly inclined handle bars 41, while mounted in one of the bars is an eye-bolt 42 to which is loosely connected a prop 43, the same being designed to hold the machine in standing position when at rest to facilitate the filling of the feed box, and this member 43 is also useful when the planter is in use on level or ridged land to prevent the overturning of the machine. Fixed to the handle bar 41 carrying the eye bolt 42 is a keeper 44 which is adapted to receive the prop 43 when not in use.

Within the seed box 19 rearwardly of the planter wheel and hinged at 45 to the bottom of said box is a vertically swinging or tilting feed board or section 46 which is formed with an upstanding end flange 47, the board or section and flange being of a width substantially the same as the width of the feed box and normally resting against the bottom and the rear end wall thereof. On the raising of the board or section 46 it serves to precipitate the seed or contents in the direction of the planter wheel, thereby varying the feed of the seed therein. It is to be noted that this tilting section is operated entirely by hand and does not depend upon a vibratory motion imparted it by the planter to feed the seed. Secured to and depending from the bottom of the seed box 19 is a pivot bearing 48 in which is pivoted a lifting member comprising a straight arm 49 from which rises an upwardly arched strap or eye 50. The strap works through a slot 51 in the bottom and rear end wall of the seed box 19 and plays against the board or section 46 so as to tilt or vertically move the same. Loosely connected to the free end of the arm 49 is a raising and lowering lever 52 which slides through a U-shaped keeper 53 fixed to the rear wall of the seed box 19 at its upper edge. The keeper is formed with a hole 54 in which engages any one of a series of hooks 54ª cut from the lever 52 so that said lever can be fastened in adjusted position on manually moving the same, and thereby hold the board or section 46 in the desired tilted position. The upper or free end of the lever 52 is formed with a handle 55 which is in convenient reach of the operator. Secured to the lever at the proper point is an angle plate 56 constituting a stop to limit the downward movement of the lever in the keeper 53, as will be obvious.

Secured to the block bearings 14 which are bolted to the frame 10 are the forward ends of spring arms or hangers 57 which at their free ends are formed with cultivating and covering teeth 58, while bolted or otherwise secured to these arms or hangers 57 adjacent to the teeth 58 is a cross plate 59 which serves as a coverer, hoe or scraper board to cover the drills after the seeds are dropped therein. Secured to the under side of the frame 10 is a support 60 for the spring arms or hangers 57 to limit the upward displacement of the arms or hangers in the operation of the planter.

Secured to the furrow wheel shaft 15 is a sprocket wheel 61, and likewise secured to the planter wheel shaft 20 is a sprocket wheel 62. Over wheels 61 and 62 is trained an endless sprocket chain 63, the same being also trained over a chain tightener comprising an idle sprocket wheel 64 mounted upon a stub shaft 65 supported in a swinging upright 66 suitably pivoted to the frame. Engaged with this stub shaft 65 is an adjustable bracket 67 which is adjustably secured to the frame by one of the bolts connecting one of the block bearings 14 thereto, and by this means the belt tightener can be adjusted to take up any slack in the endless chain 63 which is driven from the furrow wheel 16 and imparts rotation to the planter wheel.

The adjustment of the plow point or foot 37 permits giving to the drilling the required depth and allows the seed to be drilled more evenly.

The manual adjustment of the tilting board or section 46 enables the operator to have complete control of the feed of the seed or contents of the seed box 19, because on the raising of said board or section it increases the quantity of seed and by lowering the said board or section it lessens the quantity of seed taken up by the cups 27 of the planter wheel, which cups discharge the seed therefrom through the spout 33 into the spout 31 and thence through the drill spout 34 into the furrow on the advancement of the machine through a field.

From the foregoing it is thought that the construction and manner of operation of the machine will be clearly understood, and therefore a more extended explanation has been omitted.

What is claimed is:

1. In a planting machine, a main frame, a seed box carried by said frame, a rotatable planter wheel within the box, means for delivering the seed from the wheel to the ground, a tilting section within the box, pivoted to the bottom of the box in rear of said wheel and manually operable means for raising and lowering said section and maintaining it in a fixed inclined position, the angle of inclination of said section constituting the means by which the feed of seed to the wheel is varied.

2. In a planting machine, a main frame, a seed box on said frame, a rotatable planter wheel within the box, means for delivering the seed from the wheel to the ground, a tilting section connected with the bottom of the box rearwardly of the wheel, the angle of inclination of said section constituting the means for varying the feed of seed to said wheel, and manually operable means for raising and lowering the section and maintaining it in a fixed inclined position.

3. In a machine of the character described, a main frame, a seed box on said frame, a rotatable planter wheel within the box, means for delivering seed from the wheel to the ground, a tilting section connected with the bottom of the box rearwardly of the wheel, the angle of inclination of said section varying the feed of seed to said wheel, and manually operable means for raising and lowering the section and maintaining it in a fixed inclined position, said section being of substantially the same width as the seed box and adapted when raised to direct the seed to the said wheel.

4. In a machine of the character described, a main frame, a seed box on said frame, a rotatable planter wheel within the box, means for delivering seed from the wheel to the ground, a tilting board connected with the bottom of the box rearwardly of the wheel for varying the feed of seed to said wheel, and means for raising and lowering the board, said board having an upstanding end flange, and both the board and flange being of substantially the same width as the seed box.

5. In a planting machine, a frame, a seed box on the frame, a seed feeding wheel rotatably supported within the seed box, a tilting section within the seed box rearwardly of the seed feeding wheel, an arm swingingly supported beneath the seed box and having means acting upon the section for raising and lowering it, a keeper on the seed box, and a lever connected to the arm and working through the keeper.

6. In a planting machine, a frame, a seed box on the frame, a seed feeding wheel rotatably supported within the seed box, a tilting section within the seed box rearwardly of the seed feeding wheel, an arm swingingly supported beneath the seed box and having an upwardly arched member acting upon the section for raising and lowering it, a keeper on the seed box, a lever connected to the arm and working through the keeper, and hooks on the lever and engageable with the keeper for locking the same in adjusted position.

7. In a machine of the character described, a main frame, a seed box on said frame, a rotatable planter wheel within the box, means for delivering seed from the wheel to the ground, a tilting section connected with the bottom of the box rearwardly of the wheel for varying the feed of seed to said wheel, means for raising and lowering the section, and a guard swingingly connected to the box above the wheel to overhang the same.

8. In a planting machine, a main frame, a seed box on said frame, a rotatable planter wheel within the box, means for delivering seed from the wheel to the ground, a tilting section for varying the feed of seed to said wheel, and a guard swingably connected to the box above the wheel to overhang the same.

9. In a machine of the character described, a main frame, a seed box on said frame, a rotatable planter wheel within the box, means for delivering seed from the wheel to the ground, a guard swingingly connected to the box above the wheel to overhang the same, and a latch mounted on the box for holding the guard in overhanging position.

10. In a planting machine, a main frame, a seed box on said frame, a rotatable planter wheel within the box, and a guard hingedly connected to the box and overhanging the wheel, said guard consisting of two spaced-apart plates receiving the wheel therebetween.

11. In a planting machine, a main frame, a seed box on said frame, a rotatable planter wheel within the box, a spout leading from the seed box, and a guard movably connected to the box, said guard consisting of two spaced plates having an opening to receive the wheel therein and having depending portions, said portions acting as means for directing seed to the spout.

12. In a machine of the character described, a main frame, a seed box on said frame, a rotatable planter wheel within the box, means for delivering seed from the wheel to the ground, said wheel having peripheral seed cups, and said seed box being provided with a depending seed channel in which the periphery of the wheel and the cups are caused to travel.

13. In a planting machine, a main frame, a seed box on said frame, a rotatable planter wheel within the box, and means for delivering seed from the wheel to the ground, said planter wheel comprising a cheek plate fixed to the rim of the wheel and having its periphery extended beyond said rim, and a second cheek plate of the same size as the first, the second cheek plate being removably attached to but spaced apart from the first and forming with the first a counter-seat, and a detachable band carrying seed cups and fitted in said counter-seat.

14. In a planting machine, a main frame, a seed box on said frame, a rotatable planter wheel within the box, and means for delivering seed from the wheel to the ground, said planter wheel comprising two cheek plates, one of the plates being fixed to one side of the rim of the wheel and the other being removably attached to the opposite side of the rim, both plates extending beyond said rim to form an annular seat, and a band detachably fitted in said seat, said band being composed of a plurality of sections each of which carries a seed cup thereon.

15. In a planting machine, a main frame, a seed box on said frame, a rotatable planter wheel within the box, and means for delivering seed from the wheel to the ground, said planter wheel carrying two concentric disks, said disks being spaced apart by the rim of the wheel and forming therewith an annular seat, and a band fitted into said seat, the band comprising a plurality of sections, each of which carries a seed cup thereon and each of which has independent means by which it is detachably secured to the rim.

16. In a planting machine, a main frame, a seed box on said frame, a rotatable planter wheel within the box, and seed-delivering means between the wheel and the ground, said wheel having a series of peripheral seed cups, and the box carrying a guard for the wheel, said guard consisting of two spaced plates having an opening therebetween to receive the wheel and having depending portions, said portions acting as means for directing seed to the said delivering means.

In testimony that I claim the foregoing as my own, I have hereto affixed my signature in the presence of two witnesses.

GEORGIA D. BURNETT.

Witnesses:
Mrs. R. G. METHOM,
R. G. METHOM.